United States Patent
Saito

(10) Patent No.: US 12,277,294 B2
(45) Date of Patent: Apr. 15, 2025

(54) ACOUSTIC INPUT APPARATUS AND METHOD, ELECTRONIC DEVICE AND COMPUTER-READABLE MEDIUM

(71) Applicant: GOERTEK INC., Shandong (CN)

(72) Inventor: Katsumi Saito, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 18/006,885

(22) PCT Filed: Sep. 16, 2021

(86) PCT No.: PCT/CN2021/118688
§ 371 (c)(1),
(2) Date: Jan. 26, 2023

(87) PCT Pub. No.: WO2023/039787
PCT Pub. Date: Mar. 23, 2023

(65) Prior Publication Data
US 2024/0248566 A1    Jul. 25, 2024

(51) Int. Cl.
G06F 3/043 (2006.01)
H04R 1/08 (2006.01)

(52) U.S. Cl.
CPC .............. G06F 3/043 (2013.01); H04R 1/08 (2013.01)

(58) Field of Classification Search
None
See application file for complete search history.

(56) References Cited

U.S. PATENT DOCUMENTS

| | | | |
|---|---|---|---|
| 6,396,484 B1 | 5/2002 | Adler et al. | |
| 2002/0126104 A1* | 9/2002 | Knowles | H03K 17/964 345/177 |
| 2011/0057877 A1* | 3/2011 | Nagashima | G06F 3/0362 345/157 |
| 2011/0319743 A1 | 12/2011 | Satoh | |
| 2012/0026114 A1 | 2/2012 | Lee et al. | |
| 2016/0299621 A1 | 10/2016 | Sah et al. | |
| 2019/0369236 A1 | 12/2019 | Rusconi et al. | |
| 2020/0122575 A1* | 4/2020 | Chion | G06F 3/03547 |
| 2021/0149519 A1* | 5/2021 | Sheng | G06F 3/04883 |

FOREIGN PATENT DOCUMENTS

CN    106095380 A    11/2016

* cited by examiner

*Primary Examiner* — Amare Mengistu
*Assistant Examiner* — Sarvesh J Nadkarni
(74) *Attorney, Agent, or Firm* — LKGlobal | Lorenz & Kopf, LLP

(57) ABSTRACT

An acoustic input apparatus, an acoustic input apparatus, an electronic device, and a computer-readable medium. A first acoustic source is configured to generate a first acoustic wave, in response to a user performing a first operation. An acoustic transducer is configured to collect an acoustic wave and convert the collected acoustic wave into an electrical signal reflecting a frequency of the collected acoustic wave. The comparing circuit is configured to receive the electrical signal, determine whether the collected acoustic wave includes the first acoustic wave based on whether the frequency meets a first preset condition, and output an operating signal. The operating signal is in a first state in response to the collected acoustic wave including the first acoustic wave. The technical solution simplifies wiring and improves robustness to electromagnetic environment, while ensuring accuracy for recognizing an input of the user.

19 Claims, 7 Drawing Sheets

ACOUSTIC INPUT APPARATUS AND METHOD, ELECTRONIC DEVICE AND COMPUTER-READABLE MEDIUM

CROSS-REFERENCE TO RELATED APPLICATIONS

This Application is a U.S. National-Stage entry under 35 U.S.C. § 371 based on International Application No. PCT/CN2021/118688, filed Sep. 16, 2021, which is hereby incorporated herein in its entirety by reference.

TECHNICAL FIELD

This application pertains to the technical field of human-machine interaction, and in particular, to an acoustic input apparatus, an acoustic input method, an electronic device, and a computer-readable medium.

BACKGROUND

Recent decades has witnessed prosperity of electronic devices. Generally, an electronic device provides an interface for interacting with a user, and the interface may include a means for inputting instructions of the user and a means for presenting information to the user. The means for inputting instructions may be, for example, a keyboard, a mouse, a joystick, a camera, a sensor, a touch screen, a microphone, a tactile glove, a button, or simply a toggle switch on the electronic device. The means for presenting information may be, for example, a display, a speaker, an olfactory emitter, a vibrating motor, or simply an indicating light. The means for inputting instructions and the means for outputting information may also be integrated in one element. For example, a touch-control screen is capable to recognize touch operations of a user while displaying graphic information, and a game pad is capable to recognize control operations of a user while prompting user through vibrations.

Rapid development of the batteries and the integrated circuits allows the interface for human-machine interaction to have more functions in one aspect, and renders electronic devices smaller sizes and more compact structures in another aspect. That is, more and more elements are desired to be disposed into an increasingly limited space within housing of an electronic device, and hence the wiring within the electronic device is becoming more and more complex. The complex wiring not only brings a great difficulty to designs and manufacture of an internal structure, but also makes the electronic device fragile to external environment changes, both electromagnetic and physical ones, and thus reduces stability of the electronic device. In addition, other objects, desirable features and characteristics will become apparent from the subsequent summary and detailed description, and the appended claims, taken in conjunction with the accompanying drawings and this background.

SUMMARY

In view of the above, an acoustic input apparatus, an acoustic input method, an electronic device, and a computer readable medium are provided according to embodiments of the present disclosure, in order to recognize an input operation of a user accurately while not laying a significant burden on wiring within an electronic device. At least following technical solutions are provided to achieve the above objective.

In one aspect, an acoustic input apparatus is provided, including: a first acoustic source, configured to generate a first acoustic wave, in response to a user performing a first operation; an acoustic transducer, configured to collect an acoustic wave and convert the collected acoustic wave into an electrical signal reflecting a frequency of the collected acoustic wave; and a comparing circuit, configured to receive the electrical signal, determine whether the collected acoustic wave includes the first acoustic wave based on whether the frequency meets a first preset condition, and output an operating signal; where the first preset condition is determined based on a first frequency of the first acoustic wave; and where the operating signal is in a first state in response to the collected acoustic wave being determined to include the first acoustic wave.

In one embodiment, the acoustic transducer and the comparing circuit is located on a circuit board of an electronic device.

In one embodiment, the first acoustic source is electrically disconnected from the circuit board.

In one embodiment, there is no cable or wiring arranged between the first acoustic source and the circuit board, and the first acoustic source is not electrically powered when generating the first acoustic wave.

In one embodiment, the first acoustic source is exposed at a housing of the electronic device.

In one embodiment, the first operation is a touch operation.

In one embodiment, the first acoustic source includes a cavity, and a dimension of the cavity is determined by the first preset condition.

In one embodiment, the first acoustic source is inlaid in a portion of the housing, and a material of the first acoustic source is different from a material of the portion.

In one embodiment, the acoustic source includes a toothed wheel, and the first operation is rolling the toothed wheel.

In one embodiment, the electrical signal further reflects an intensity of the collected acoustic wave. The comparing circuit is configured to determine whether the collected acoustic wave includes the first acoustic wave further based on whether the intensity meets a second preset condition. The second preset condition is determined based on a first intensity of the first acoustic wave.

In one embodiment, the acoustic input apparatus further includes: a second acoustic source, configured to generate a second acoustic wave, in response to the user performing a second operation. The comparing circuit is further configured to determine whether the collected acoustic wave includes the second acoustic wave based on whether the frequency meets a third preset condition. The third preset condition is determined based on a second frequency of the second acoustic wave. The operating signal is in a second state in response to the collected acoustic wave being determined to include the second acoustic wave.

In one embodiment, the second operation is the first operation. The first acoustic wave and the second acoustic wave are different in frequency, different in intensity, or different in both frequency and intensity.

In one embodiment, the second operation and the first operation are performed at different portions of the housing.

In one embodiment, the operating signal is in a third state in response to the collected acoustic wave being determined to include both the first acoustic wave and the second acoustic wave, and in a fourth state in response to the collected acoustic wave not being determined to include the first acoustic wave or the second acoustic wave.

In one embodiment, the operating signal includes a first signal and a second signal. The first signal is in a fifth state in response to the collected acoustic wave being determined to include the first acoustic wave, and in a sixth state in response to the collected acoustic wave not being determined to include the first acoustic wave. The second signal is in a seventh state in response to the collected acoustic wave being determined to include the second acoustic wave, and in an eighth state in response to the collected acoustic wave not being determined to include the second acoustic wave.

In one embodiment, the comparing circuit is configured to determine whether the collected acoustic wave includes the second acoustic wave, further based on whether the intensity of the collected acoustic wave meets a fourth preset condition. The fourth preset condition is determined based on a second intensity of the second acoustic wave.

In one embodiment, the first preset condition includes one or both of the frequency being higher than a first threshold and the frequency being lower than a second threshold. In one embodiment, the third preset condition includes one or both of the frequency being higher than a third threshold and the frequency being lower than a fourth threshold.

In another aspect, an acoustic input method is provided, including: generating, by a first acoustic source, a first acoustic wave, in response to a user performing a first operation; collecting, by an acoustic transducer, an acoustic wave; converting, by an acoustic transducer, the acoustic wave into an electrical signal reflecting a frequency of the collected acoustic wave; receiving, by a comparing circuit, the electrical signal; determining, by the comparing circuit, whether the frequency meets a first preset condition, to obtain a first result; determining, by the comparing circuit, whether the collected acoustic wave includes the first acoustic wave based on the first result; and outputting an operating signal by the comparing circuit, where the operating signal is in a first state in response to the collected acoustic wave being determined to include the first acoustic wave. The first preset condition is determined based on a first frequency of the first acoustic wave.

In one embodiment, the electrical signal further reflects an intensity of the collected acoustic wave. The acoustic input method further includes: determining, by the comparing circuit, whether the intensity of the collected acoustic wave meets a second preset condition, to obtain a second result. The second preset condition is determined based on a first intensity of the first acoustic wave. Determining whether the collected acoustic wave includes the first acoustic wave based on the first result includes: determining whether the collected acoustic wave includes the first acoustic wave based on the first result and the second result.

In one embodiment, the acoustic input method further includes: generating, by a second acoustic source, a second acoustic wave, in response to a user performing a second operation; determining, by the comparing circuit, whether the frequency meets a third preset condition, to obtain a third result; and determining, by the comparing circuit, whether the collected acoustic wave includes the second acoustic wave based on the third result. The third preset condition is determined based on a second frequency of the second acoustic wave. The operating signal is in a second state in response to the collected acoustic wave being determined to include the second acoustic wave.

In one embodiment, the acoustic input method further includes: determining, by the comparing circuit, whether the intensity of the collected acoustic wave meets a fourth preset condition, to obtain a fourth result. The fourth preset condition is determined based on a second intensity of the second acoustic wave. Determining whether the collected acoustic wave includes the second acoustic wave based on the third result includes: determining whether the collected acoustic wave includes the second acoustic wave based on the third result and the fourth result.

In another aspect, an electronic device is provided, including any foregoing acoustic input apparatus. Alternatively, the electronic device includes a processor, and a memory storing instructions. The instructions when executed by the processor configure the electronic device to perform any foregoing acoustic input method.

In one embodiment, the electronic device further includes a target element. A state of the target element is determined by a state of the operating signal.

In another aspect, a non-transitory computer-readable medium is provided. The computer-readable medium stores instructions, and the instructions when executed by a processor configure a computer to perform any foregoing acoustic input method.

According to embodiments of the present disclosure, the acoustic input apparatus includes the first acoustic source, the acoustic transducer, and the comparing circuit. The first acoustic source is configured to generate the first acoustic wave, in response to the user performing the first operation. The acoustic transducer is configured to collect the acoustic wave and convert the collected acoustic wave into the electrical signal reflecting the frequency of the collected acoustic wave. The comparing circuit is configured to receive the electrical signal, determine whether the collected acoustic wave includes the first acoustic wave based on whether the frequency meets the first preset condition, and output the operating signal. The operating signal is in a first state in response to the collected acoustic wave including the first acoustic wave. Instead of an electrical signal, the operation of the user is embodied as the first acoustic wave that is transmitted from the first acoustic source to the acoustic transducer, and such transmission requires no electrical connection between the first acoustic source and the acoustic transducer. That is, the acoustic input apparatus is simplified in wiring, and robust to electromagnetic environment within an electronic device. Further, the frequency of the collected electronic wave serves as a criterion for controlling the state of the operating signal outputted by the acoustic input apparatus, which ensures accuracy for recognizing an input of the user.

Those skilled in the art could appreciate that the acoustic input method and the electronic device can also achieve the above technical effect.

BRIEF DESCRIPTION OF THE DRAWINGS

The present invention will hereinafter be described in conjunction with the following drawing figures, wherein like numerals denote like elements, and.

DETAILED DESCRIPTION OF THE EMBODIMENTS

The following detailed description is merely exemplary in nature and is not intended to limit the invention or the application and uses of the invention. Furthermore, there is no intention to be bound by any theory presented in the preceding background of the invention or the following detailed description.

Hereinafter technical solutions in embodiments of the present disclosure are described in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

As described in the background, the complex wiring not only brings a great difficulty to designs and manufacture of an internal structure, but also makes the electronic device fragile to external environment changes and thus reduces stability of the electronic device. Hence, it is desirable to find a new structure which can simplify wiring within an electronic device. Embodiments of the present disclosure provide a technical solution in which a signal indicating an operation of a user is transmitted in a form of an acoustic wave, and hence saving electronic connection in such transmission.

Figure 1:
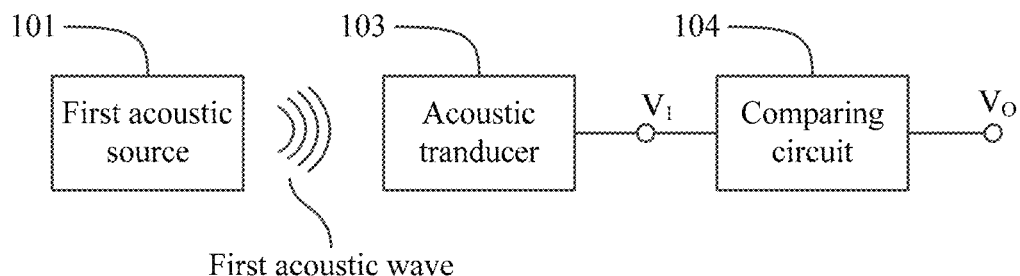
FIG. 1 is a schematic structural diagram of an acoustic input apparatus according to an embodiment of the present disclosure.

In a first aspect of embodiments of the present disclosure, an acoustic input apparatus is provided. Reference is made to FIG. 1, which is a schematic structural diagram of an acoustic input apparatus according to an embodiment of the present disclosure. As shown in FIG. 1, an acoustic input apparatus 10 includes a first acoustic source 101, an acoustic transducer 103, and a comparing circuit 104. The acoustic input apparatus 10 may be applied to an electronic device 1 (not depicted in FIG. 1) as a means for recognizing an input of a user. That is, the acoustic apparatus 10 may serve as an intrinsic part of the electronic device 1, or may be an independent element capable to be mounted on or connected to the electronic device In some embodiments, the acoustic apparatus 10 may be attached or connected to the electronic device 1 via a designated connector or a universal connector. The connection or the attachment between the acoustic apparatus 10 and the electronic device 1 may be fixed or detachable, and the connection between the acoustic apparatus 10 and the electronic device 1 may be wired or wireless, which is not limited herein.

The first acoustic source 101 is configured to generate a first acoustic wave, in response to a user performing a first operation. Namely, the first acoustic source 101 is a structure that can convert an operation of the user into an acoustic wave. In some embodiments, the first acoustic source 10 is exposed at a housing of the electronic device 1, to facilitate the user performing the first operation. In such case, the first operation may be directly applied to the first acoustic source 10 and make the first acoustic source 10 generate the first acoustic wave. For example, the first acoustic source 10 is a metal plate located at an outer surface of the housing, and the user can make a sound by simply rapping on the metal plate. In other embodiments, the first acoustic source 10 is located within a housing of the electronic device 1, and is electrically or mechanically connected to another element disposed at the housing. In such case, the first operation may be directly applied to the element disposed at the housing, and change a state of such element. The change of the state of the element would make the first acoustic source 10 generate the first acoustic wave, via the electrical or the mechanical connection. For example, the first acoustic source 10 is a metal plate located inside the housing, at least a metal pin is suspended above the metal plate and is fixedly connected to a push button located at a surface of the housing, and the pin strikes the piece of metal to produce a sound when the user pushes the button.

The first acoustic source 101 may be implemented in various structures. In some embodiments, the first acoustic source 101 is not electrically powered. Generally, in such case, the first acoustic wave is mechanically generated. Hence, there may be no wire or cable for supplying power to the first acoustic source 101, which simplifies wiring within the electronic device to the most extent. The first acoustic source 101 without an electric power may be, for example, the metal plate as illustrated above, or any other mechanical structure capable to make a sound. In other embodiments, the first acoustic source 101 may be electrically powered to generate the first acoustic wave. For example, the first acoustic source 101 may be a buzzer, which can be triggered by the first operation of the user.

The first acoustic wave generated by the first acoustic source 101 is, generally speaking, a sound. The first acoustic wave may be audible, that is, may have a frequency ranging between approximately 20 Hz to 20 kHz and an intensity perceivable by human ears. Alternatively, the first acoustic wave may be inaudible, such as being an ultrasonic wave and/or being weaker than the perceivable limit. The first acoustic wave may include one or more frequency components, which is mainly determined by a structure of the first acoustic source 101.

The first operation of the user is not limited herein, and may be determined by a form of the first acoustic source 101 and an application scenario to which the acoustic input apparatus 10 is applied. The first operation may or may not be performed directly on the first acoustic source. For example, when the first acoustic source 101 is the metal plate as illustrated above, the first operation refers to rapping on the metal plate or pushing the button to strike the metal plate. For another example, when the first acoustic source 101 is a buzzer, the first operation may be turning on a switch to activate the buzzer, or may be touching a touch-control screen to activate the buzzer. There may be a delay between the moment when the first operation is performed and the moment when the first acoustic wave is generated, and the delay may be intentionally set or may be originated from an intrinsic electrical or mechanical feature of the first acoustic source 101.

Hereinafter discussed are some examples in which the first acoustic source 101 is exposed at the housing of the electronic device 1, and the first operation is performed directly on the first acoustic source.

In some embodiments, the first operation may be a touch operation. That is, the first operation may include one or more of a single tap, double taps, a finger slide, or a press on the electronic device 1. Since the touch operation is a simple, it is quite convenient for the user to interact with the electronic device, but brings a challenge of generating the first acoustic wave that can be easily recognized. A manner of address such issue is to configure a "prominent" frequency in the first acoustic wave. That is, the more concentrated the frequency spectrum of a sound is distributed, or the more greatly the sound differs from ambient noise in frequency, the more easily a sound is recognized from the ambient noise. Therefore, the first acoustic source may have a structure that can generate an acoustic wave of a certain frequency.

Figure 2:
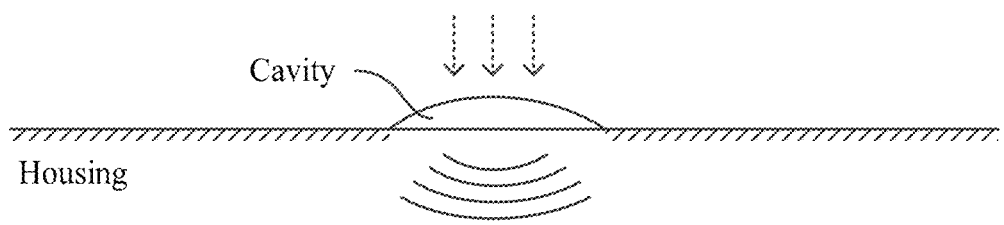
FIG. 2 is a schematic structural diagram of a first acoustic source according to an embodiment of the present disclosure.

Reference is made to FIG. 2, which is a schematic structural diagram of a first acoustic source according to an embodiment of the present disclosure. In an embodiment, the first acoustic source 101 includes a cavity. The touch operation (indicated by dashed arrows in FIG. 2) may be performed on the first acoustic source 101 by striking an exposed surface (i.e. the upper surface in FIG. 2) of the cavity with a finger, a stylus, or the like. In such case, the vibrations caused by the striking would follow a mode defined by a dimension of the cavity, and thus generate a sound having a frequency corresponding to such mode. Therefore, the dimension of the cavity may be determined based on a frequency, or a range of the frequency, that is to be recognized by the acoustic input apparatus 10, i.e. by the acoustic transducer 103 and the comparing circuit 104, as discussed in following description. As shown in FIG. 2, the cavity may be a dome, and an upper surface of the dome may be curved to provide a good mechanical support against the first operation, as well as facilitate transmitting the first acoustic wave downward. A lower surface of the dome may be a surface of the housing of the electrical device 1, or may be a membrane for better transmission of the first acoustic wave. The cavity may alternatively have a shape other than the dome, for example, may be rectangular, cubical, cylindrical, spindly, or even conical. The present disclosure is not limited thereto, as long as the shape can provide a frequency mode in which most energy of the first acoustic wave is concentrated.

Figure 3:
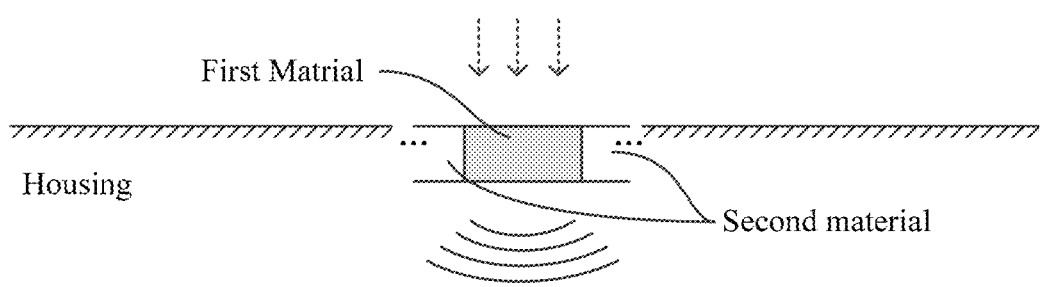
FIG. 3 is another schematic structural diagram of a first acoustic source according to an embodiment of the present disclosure.

Reference is made to FIG. 3, which is another schematic structural diagram of a first acoustic source according to an embodiment of the present disclosure. In an embodiment, the first acoustic source 101 is inlaid in a portion of the housing of the electronic device 1, and a material of the first acoustic source 101 is different from a material of such portion of the housing. As shown in FIG. 3, the first acoustic source is an inlay made of a first material, and the portion of the housing is made of a second material different from the first material. Hence, a sound generated from a touch operation performed on the second material may be different in frequency from that (i.e. the first acoustic wave) generated from a touch operation (i.e. the first operation) performed on the first material. Types of the first material and the second material are not limited herein, as long as the frequencies of the sound generated from the two materials are different. For example, the first material may be metal and the second material may be plastic, or vice versa. A manner of generating an acoustic through the material of the first acoustic source 101 is not limited. For example, the first operation may be tapping the material, rubbing, or scratching the material. Moreover, a shape of the inlay is not limited, and is determined by a region effective for performing the first operation. For example, the first material may be rectangular, circular, triangular, or an irregular shape. The first material may be provided with a structure which can enhance the first acoustic wave.

Figure 4:
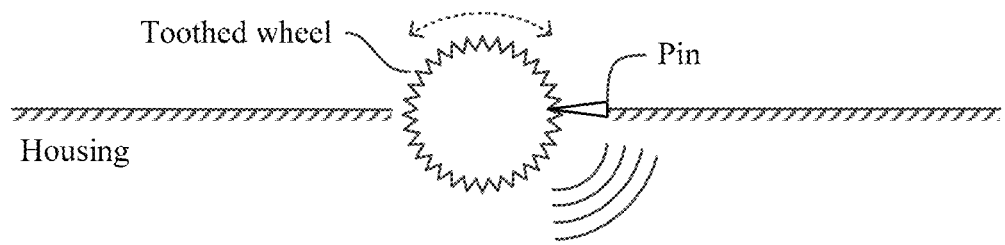
FIG. 4 is another schematic structural diagram of a first acoustic source according to an embodiment of the present disclosure.

In some embodiments, the first operation may be other than the touch operation, which is not limited herein and depends on a structure of the first acoustic source 101. As an example, reference is made to FIG. 4, which is another schematic structural diagram of a first acoustic source according to an embodiment of the present disclosure. In one embodiment, the first acoustic source 101 includes a toothed wheel, and the first operation is rolling the toothed wheel. As shown in FIG. 4, a pin is disposed adjacent to the toothed wheel, and can be hit by the teeth on the toothed wheel. Hence, when the toothed wheel rotates, the first acoustic source is capable to generate a sound (i.e. the first acoustic wave), and a frequency component of the sound is in proportion to a speed of the rotation. That is, the faster the rolling is, the higher the frequency component is. In such case, first acoustic waves having different frequency components can be generated by rolling the toothed wheel at different speeds. It is noted that the pin in FIG. 4 may be replaced by another element that can generate a sound when hitting by the teeth of the toothed wheel, for example, may be replaced by an elastic edge or a protrusion. Moreover, the toothed structure may have another form other than the toothed wheel, for example, a toothed rack. In such case, the first operation may aim at triggering sliding movement between the toothed rack and a corresponding structure. This embodiment is not limited to the above cases.

The acoustic transducer 103 is configured to collect an acoustic wave and convert the collected acoustic wave into an electrical signal $V_{in}$ reflecting a frequency of the collected acoustic wave. Details of the collected acoustic wave may refer to those of the first acoustic wave, and are not repeated herein. The frequency refers to at least one of one or more frequency components of the collected acoustic wave. Those skilled in the art can appreciate that the electrical signal $V_{in}$ reflecting the frequency refers to that the acoustic transducer 103 is capable to collect and convert at least one frequency component of the acoustic wave. In comparison, other frequency components may be collected and converted, or may not be collected or converted, by the acoustic transducer 10, which is not limited herein. Correspondingly, a form and a structure of the acoustic transducer 103 is not limited herein, as long as it is capable to convert the acoustic wave into the electrical signal. In some embodiments, the acoustic transducer 103 may be a microphone.

Figure 5:
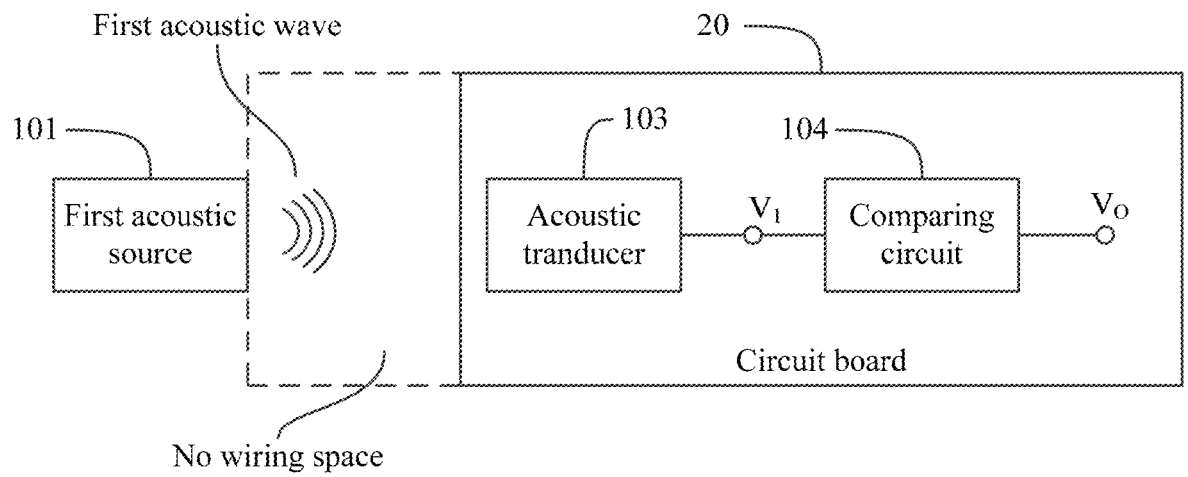
FIG. 5 is a schematic structural diagram of an acoustic input apparatus in an electronic device according to an embodiment of the present disclosure.

Reference is made to FIG. 5, which is a schematic structural diagram of an acoustic input apparatus in an electronic device according to an embodiment of the present disclosure. In one embodiment, the acoustic transducer 103 may be disposed on a circuit board 20 of the electronic device 1. Such circuit board 20 may be a main board inside the electronic device 1. In some embodiments, the first acoustic source 103 is electrically disconnected from the circuit board. That is, the first acoustic source 103 is neither electrically coupled to the acoustic transducer 102 nor electrically coupled to other components on the circuit board, therefore saving wires or cables connecting the first acoustic source 103 and the circuit board 20. Additionally, in some embodiments, there is no cable or wire disposed between the first acoustic source 103 and the circuit board 20. As shown in FIG. 5, there is a "clear" space between the first acoustic source 103 and the circuit board 20, which contains no wiring. Such arrangement not only reduces wiring in the electronic device 1, but also brings beneficial effects when electromagnet interference is strong in the "clear" space or no optical blockage is desirable in the "clear" space. For example, when there is a radio-frequency antenna or an optical imaging system located within such space, wires or cable located in the same space would interfere with their operation, while the acoustic wave would produce no negative effect. The first acoustic source 103 may be not electrically powered when generating the first acoustic wave to facilitate providing the electrical disconnection or the "clear" space as mentioned above.

It is also noted that the electrical disconnection or the "clear" space may indicate that the first acoustic source 103 is physically and/or electrically independent from the circuit board 20, but does not mean the first acoustic source 103 is not electrically powered. For example, the first acoustic source 103 may receive power from an independent power source, such as a battery located at a position away from the circuit board 20, or a solar cell located at a surface of the electronic device 1.

The electrical signal $V_{in}$ reflecting the frequency refers to that the electrical signal $V_{in}$ carries information concerning the frequency, and the frequency can be learned from the electrical signal $V_{in}$. For example, the electrical signal $V_{in}$ may vary under the frequency. Temporally, the electrical signal $V_{in}$ may exactly follow a real-time intensity of the collected acoustic wave, i.e., the electrical signal $V_{in}$ presents a waveform identical to that of the collected acoustic wave. Alternatively, the electrical signal $V_{in}$ may include one or more of: a sigmoidal wave, a triangular wave, or a square wave having frequencies corresponding to frequency components in the collected acoustic wave. The present disclosure is not limited to the above examples. Moreover, the electrical signal $V_{in}$ may be either analog or digital, which depends on a type of output(s) of the acoustic transducer.

The comparing circuit 104 is configured to receive the electrical signal $V_{in}$, determine whether the collected acoustic wave includes the first acoustic wave based on whether the frequency meets a first preset condition, and output an operating signal Vo. The operating signal is in a first state in response to the collected acoustic wave including the first acoustic wave. The first comparing circuit 104 may be located on the same circuit board 20 as the acoustic transducer 103, as shown in FIG. 5. The first comparing circuit 104 may further be connected to the acoustic transducer via wiring on the circuit board 20. In such case, the wiring of the electronic device 1 may be concentrated on the circuit board 20, and the wiring outside the circuit board 20 is minimized, which at least simplify assembly of the electronic device 1. The comparing circuit 104 may be implemented in various structures. Since the state of the outputted operating signal Vo is determined based on the frequency, the comparing circuit 104 should at least be capable to acquire the frequency from the electrical signal $V_{in}$. In one embodiment, in a case that the collected electrical signal $V_{in}$ is analog, the comparing circuit 104 includes a converting sub-circuit configured to convert the collected electrical signal $V_{in}$ into a pulsed signal having the frequency. In one embodiment, the comparing circuit may include a frequency reading sub-circuit configured to read the frequency from the pulsed signal, or directly from the collected electrical signal $V_{in}$.

The first preset condition is determined based on a first frequency of the first acoustic wave. For example, the first preset condition is determined by the "prominent" frequency component in the first acoustic wave. Herein the first frequency of the first acoustic wave may refer to an empirical value obtained by history first operations, or simply a theoretical value considering the acoustic characteristic of the electronic device 1. Generally, the first preset condition refers to the first frequency is within a first range determined by the first acoustic wave. The first range may be approximately around the frequency of the first acoustic wave, with a reasonable margin. For example, the first preset condition refers to the first frequency being larger than a first threshold $f_1$, being smaller than a second threshold $f_2$, ranging from the first threshold $f_1$ and the second threshold $f_2$, or not ranging from the first threshold $f_1$ and the second threshold $f_2$. It is appreciated that the first range may alternatively be multiple segments that are not consecutive. In some embodiments, the first range may be preset or fixed, i.e., not changed during the usage of the electronic device 1. In other embodiments, the first range may be variable, that is, may be changed based on an instruction from the user or a parameter of an environment during application.

Corresponding to the first preset condition, the comparing circuit 104 includes a first determining sub-circuit, configured to determine whether the first preset condition is met. For example, the first determining sub-circuit is configured to compare the first frequency and one or more referential frequencies, to determine whether the first frequency is within the first range. In case of the fixed or preset first range, the one or more referential frequencies may be preset. In case of the variable first range, the one or more referential frequencies may be determined based on, for example, the instruction from the user or the parameter of the environment during application. In either case, the referential frequency may be either an intrinsic signal in the first determining sub-circuit or obtained from an outside signal.

Herein a correspondence between whether the collected acoustic wave includes the first acoustic wave and whether the frequency meets the first preset condition is not limited. In some embodiments, the frequency meeting the first preset condition indicates that the collected acoustic wave includes the first acoustic wave, while the frequency not meeting the first preset condition indicates that the collected acoustic wave does not include the first acoustic wave. In other embodiments, the frequency not meeting the first preset condition indicates that the collected acoustic wave includes the first acoustic wave, while the frequency meeting the first preset condition indicates that the collected acoustic wave does not include the first acoustic wave. Generally, the collected acoustic wave including the first acoustic wave indicates that the first operation is performed on the first acoustic source 101, while collected acoustic wave not including the first acoustic wave indicates that the first operation is not performed on the first acoustic source 101. Therefore, through the frequency and the first preset condition, the state of the operating signal Vo is correlated with recognition of the first operation performed by the user.

The operating signal Vo has at least two different states. That is, there is at least one state, such as a second state, other than the first state. For example, the first state of the operating signal Vo indicates that the collected acoustic wave includes the first acoustic wave, while the second state of the operating signal Vo indicates that the collected acoustic wave does not the first acoustic wave. The first state and the second state may be implemented in various manners. For example, the first state and the second state may be a high level and a low level, or a low level and a high level, respectively. For another example, the first state and the second state may be simply two signals having different waveforms, such as two sigmoidal wave having different frequencies. In a case that the operating signal Vo is a digital signal having only one channel, the first signal and the second signal may be logic "1" and "0", or "0" and "1", respectively. In a case that the operating signal having two channels, the first signal and the second signal may be any two of the two logic combinations "00", "01", "10", and "11", respectively. The cases of more channels can be deduced by analogy, which is not enumerated herein. It is appreciated that more than two states of operating signal Vo are also applicable in this embodiment.

In practical applications, the operating signal Vo may be outputted to a target element 30 of the electronic device 1, and configured to control a state of the target element 30. That is, the state of the target element 30 changes based on the state of the operating signal Vo. The target element 30 may be, for example, a switch transistor, an indicating light, a display screen, a fan, a buzzer, a vibrating motor, or any other appropriate element to be controlled in the electronic device 1.

In one embodiment, the electrical signal $V_{in}$ further reflects an intensity of the collected acoustic wave. The comparing circuit is further configured to determine whether the collected acoustic wave includes the first acoustic wave further based on whether the intensity of the collected acoustic wave meets a second preset condition. The electrical signal $V_{in}$ reflecting the intensity of the collected acoustic wave refers to that the electrical signal $V_{in}$ carries information concerning the intensity of the collected acoustic wave, and the intensity of the collected acoustic wave can be learned from the electrical signal $V_{in}$. As an example, the electrical signal $V_{in}$ may exactly follow a real-time intensity of the collected acoustic wave temporally. As another example, the electrical signal $V_{in}$ may include two channels, one of which reflects the frequency (such as a sigmoidal wave having the first frequency), the other of which reflects the intensity (such as a level reflecting an average intensity or a maximum intensity of the first frequency wave).

In this embodiment, since the state of the outputted operating signal Vo is determined based on the intensity of the first acoustic wave, the comparing circuit 104 should at least be capable to recognize the intensity of the collected acoustic wave from the electrical signal $V_{in}$. In one embodiment, the comparing circuit 104 may further include an intensity reading sub-circuit, which is configured to read an average intensity, a maximum intensity, or the like, of the collected acoustic wave.

The second preset condition is determined based on a first intensity of the first acoustic wave generated by the first operation. Herein the first intensity of the first acoustic wave may refer to an empirical value obtained by history first operations, or simply a theoretical value considering the acoustic characteristic of the electronic device 1. Generally, the second preset condition refers to the intensity of the first acoustic wave is within a second range. The second range may be approximately around or greater than the first intensity of the first acoustic wave, with a reasonable margin. For example, the second preset condition refers to the intensity being larger than a first threshold $I_1$, being smaller than a second threshold $I_2$, ranging from the first threshold $I_1$ and the second threshold $I_2$, or not ranging from the first threshold $I_1$ and the second threshold $I_2$. Similar to the first range, the second range may alternatively be multiple segments that are not consecutive. In some embodiments, the second range may be preset or fixed, i.e., not changed during the usage of the electronic device 1. In other embodiment, the first range may be variable, that is, may be changed based on an instruction from the user or a parameter of an environment during application. For example, the first threshold $I_1$ and/or the second threshold $I_2$ may be increased in a case the environment is noisier, to prevent an interference of the environment on the recognition of the first acoustic wave.

Corresponding to the second preset condition, the comparing circuit 104 includes a second determining sub-circuit, configured to determine whether the second preset condition is meet. For example, the second determining sub-circuit is configured to compare the intensity of the first acoustic wave and one or more referential intensities, to determine whether the intensity is within the second range. Similar to the referential frequency, the one or more referential intensities may be preset, or may be determined based on, for example, the instruction from the user or the parameter of the environment during application. In either case, the referential intensity may be either an intrinsic signal in the first determining sub-circuit or obtained from an outside signal.

A correspondence between whether the collected acoustic wave includes the first acoustic wave and whether the intensity meets the second preset condition is not limited. In some embodiments, the intensity meeting the second preset condition indicates that the collected acoustic wave includes the first acoustic wave, while the intensity not meeting the second preset condition indicates that the collected acoustic wave does not include the first acoustic wave. Generally, in such case, the second preset condition is the intensity being greater (or no less) than a third threshold, in order to distinguish the first acoustic wave from ambient noise. In other embodiments, the intensity not meeting the second preset condition indicates that the collected acoustic wave includes the first acoustic wave, while the intensity meeting the second preset condition indicates that the collected acoustic wave does not include the first acoustic wave. Generally, in such case, the second preset condition is the intensity being less (or no greater) than a fourth threshold. Therefore, besides the frequency and the first preset condition, the intensity and the second preset condition are further applied to correlate the state of the operating signal Vo more accurately with recognition of the first operation performed by the user.

In the above embodiments, the second preset condition is taken into consideration on a basis of the first preset condition. Namely, the intensity serves as an auxiliary criterion for determination. For example, it is determined that the collected acoustic wave includes the first acoustic wave when both the first preset condition and the second preset condition is met, and it is determined that the collected acoustic wave does not include the first acoustic wave when either the first preset condition or the second preset condition is not met.

According to embodiments of the present disclosure, the acoustic input apparatus includes the first acoustic source, the acoustic transducer, and the comparing circuit. The first acoustic source is configured to generate the first acoustic wave, in response to the user performing the first operation. The acoustic transducer is configured to collect the acoustic wave and convert the collected acoustic wave into the electrical signal reflecting the frequency of the collected acoustic wave. The comparing circuit is configured to receive the electrical signal, determine whether the collected acoustic wave includes the first acoustic wave based on whether the frequency meets the first preset condition, and output the operating signal. The state of the operating signal is determined based on whether the collected acoustic wave includes the first acoustic wave. Instead of an electrical signal, the operation of the user is embodied as the first acoustic wave that is transmitted from the first acoustic source to the acoustic transducer, and such transmission requires no electrical connection between the first acoustic source and the acoustic transducer. That is, the acoustic input apparatus is simplified in wiring and robust to electromagnetic environment within an electronic device. Further, the frequency of the collected electronic wave serves as a criterion for controlling the state of the operating signal outputted by the acoustic input apparatus, which ensures accuracy for recognizing an input of the user.

Figure 6:
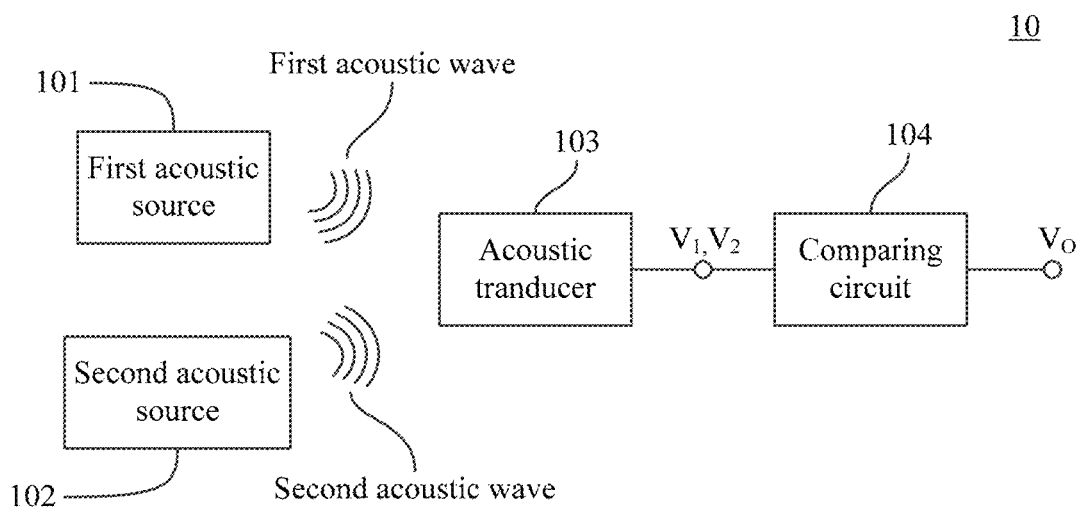
FIG. 6 is another schematic structural diagram of an acoustic input apparatus according to an embodiment of the present disclosure.

Additionally, the acoustic input apparatus may include more acoustic sources, in order to expand a functional range and/or improve accuracy of recognizing an operation of the user. Reference is made to FIG. 6, which is another schematic structural diagram of an acoustic input apparatus according to an embodiment of the present disclosure. As shown in FIG. 6, the acoustic input apparatus further includes a second acoustic source 102, which is configured to generate a second acoustic wave in response to the user performing a second operation. The comparing circuit is further configured to determine whether the collected acoustic wave includes the second acoustic wave based on whether the frequency meets a third preset condition. The operating signal Vo is in a second state in response to the collected acoustic wave being determined to include the second acoustic wave. Since the first state and the second state corresponds to including the first acoustic wave and the second acoustic wave, respectively, it is noted that in some embodiments the first state and the second state are not mutually exclusive, because it is possible that collected acoustic wave includes both the first acoustic wave and the second acoustic wave.

A type and a structure of the second acoustic source 102 may refer to those of the first acoustic source 101, which are not repeated in details herein. In some embodiments, the second acoustic source 102 is functionally independent from the first acoustic source 101. That is, the second acoustic source 102 and the first acoustic source 101 correspond to two independent input channels which recognize input operations from the user, and the two input channels does not interact with each other except sharing the same acoustic transducer 103 and the comparing circuit 104. In other embodiments, the second acoustic source 102 may constitute an input channel with the first acoustic source, or the two channels interact with each other at the acoustic transducer 103 or the comparing circuit 104.

In some embodiments, the third preset condition is determined based on a second frequency of the second acoustic wave. Details of the third preset condition for the second acoustic wave may refer to the foregoing description of the first preset condition for the first acoustic wave, and hence are not repeated herein.

Hereafter illustrated are some exemplary examples.

In one embodiment, the second operation is the first operation (hereinafter called "the operation"). That is, the operation is capable to generate both the first acoustic wave and the second acoustic wave. In such case, both the first preset condition and the third preset condition may serve as a criterion to recognize such operation. In some embodiments, the first acoustic wave and the second acoustic wave are different in frequency, different in intensity, or different in both frequency and intensity. Accordingly, the first preset condition is different from the third preset condition. Specifically, in some embodiments, the first preset condition and the third preset condition corresponds to frequency ranges that do not overlap with each other. Additionally or alternatively, the first preset condition and the third preset condition corresponds to intensity ranges that do not overlap with each other. It is determined that the operation is performed only when both the first preset condition and the third preset condition are met. Hence, the operating signal Vo may be in a third state, which indicates the operation being performed, in response to the collected acoustic wave being determined to include both the first acoustic wave and the second acoustic wave, and in a fourth state, which indicates the operation not being performed, in response to the collected acoustic wave not including the first acoustic wave or the second acoustic wave. The combination of the two conditions renders the recognition of the operation more accurate. In other embodiments, the first acoustic wave and the second acoustic wave may be identical in frequency. Accordingly, the first preset condition is same as the third preset condition, and it is determined that the operation is performed when either the first acoustic source 101 or the second acoustic source 102 is triggered. Hence, the operating signal Vo may be in a third state, which indicates the operation being performed, in response to the collected acoustic wave being determined to include the first acoustic wave or the second acoustic wave, and in a fourth state, which indicates the operation not being performed, in response to the collected acoustic wave being determined to include neither the first acoustic wave nor the second acoustic wave. The "parallel" configuration of the acoustic sources can improve stability and robustness of recognition of the operation. Namely, even if the operation is not so "standard" or one of the acoustic sources malfunctions, the operation is still capable to be recognized.

In the above examples, a relationship among the first state, the second state, and the third state are not limited. The three states may be different from each other, may include a pair of identical states, or may be all identical.

In some embodiments, the second acoustic source 102 is located adjacent to the first acoustic source 101, to facilitate such operation acting on both the first acoustic source 101 and the second acoustic source 102.

Figure 7:
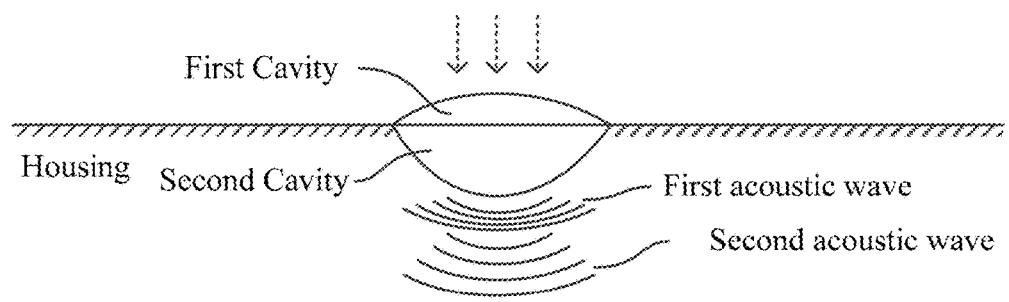
FIG. 7 is another schematic structural diagram of a first acoustic source according to an embodiment of the present disclosure.

As an example, the first acoustic source 101 and the second acoustic source 102 are two stacked cavities, and the operation is a touch operation on the stacked cavities. Reference is made to FIG. 7, which is another schematic structural diagram of a first acoustic source according to an embodiment of the present disclosure. In FIG. 7, the two cavities are both dome-shaped, and have different dimensions such that the frequencies of the first acoustic wave and the second acoustic wave are different. The first cavity is located on an outer surface of the housing of the electronic device 1, and the second cavity is located on an inner surface of the housing. The operation may be a tap on a curved surface of the first cavity, as shown in FIG. 7. When the curve surface is tapped, the first cavity generates the first acoustic wave, and the vibrations are further transmitted into the second cavity to generate the second acoustic wave. Both the first acoustic wave and the second acoustic wave are transmitted towards the acoustic transducer 103 (not depicted and assumed to be located under the two cavities in FIG. 6). It is appreciated that the two cavities may have alternative configurations, which are not limited herein. For example, the two cavities may have other shapes. For example, a membrane may serve as a common wall between the two cavities. For example, the two stacked cavities may be horizontally aligned instead of vertically stacked. Moreover, as discussed above, the two cavities may have same dimensions in case of requiring the first preset condition identical to the third preset condition.

Figure 8:
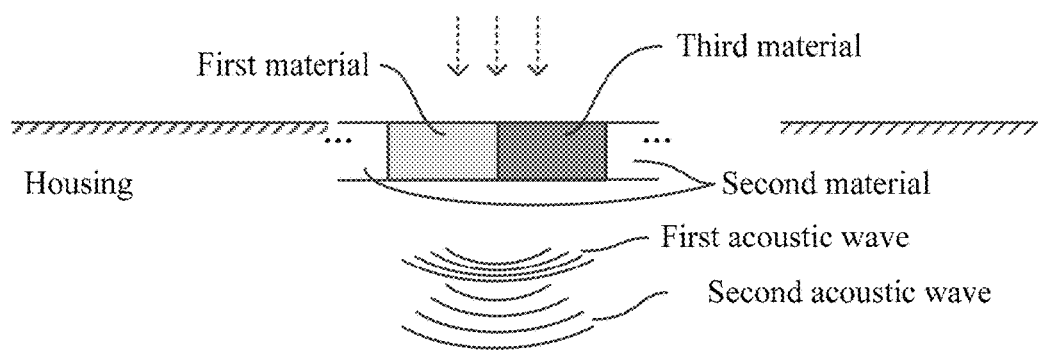
FIG. 8 is another schematic structural diagram of a first acoustic source according to an embodiment of the present disclosure.

As another example, the first acoustic source 101 and the second acoustic source 102 may be two adjacent inlays located on a surface of a portion of the housing. The two inlays may be made of different materials. Reference is made to FIG. 8, which is another schematic structural diagram of a first acoustic source according to an embodiment of the present disclosure. As shown in FIG. 8, the two inlays are made of a first material and a third material, respectively, while the portion of the housing is made of a second material. Generally, the first material and the third material are different from the second material. The operation may be a tap or a scratch at a region of the two inlays. The first material when being tapped or scratched would generate the first acoustic wave, and may transmit a part of vibrations to the third material, such that the third material would also generate the second acoustic wave, and vice versa. Hence, when either inlay is tapped or scratched, both the first acoustic wave and the second acoustic wave are transmitted towards the acoustic transducer 103 (not depicted and assumed to be located under the two inlays in FIG. 8). It is appreciated that the two inlays may have alternative configurations, which are not limited herein. For example, the two inlays may be vertically stacked instead of horizontally aligned. Moreover, as discussed above, the two inlays may have a same material in case of requiring the first preset condition identical to the third preset condition.

Alternatively, in the foregoing embodiments, the first acoustic source 101 and the second acoustic source 102 may be separated by a distance greater than zero. In such case, the operation may be performed on an element or adjacent elements located on the housing of the electronic device, and the element or the adjacent elements when subjected to the operation trigger the first acoustic source and the second acoustic source to generate the first acoustic wave and the second acoustic wave, respectively.

In one embodiment, the second operation and the first operation are performed at different portions of the housing. That is, the first operation and the second operation are different from each other, and may be separately performed. In such case, the first preset condition and the third preset condition may serve as criterions to recognize different operations on different locations, respectively.

In some embodiments, the first acoustic wave and the second acoustic wave are different in frequency, different in intensity, or different in both frequency and intensity. Accordingly, the first preset condition is different from the third preset condition. Specifically, in some embodiments, the first preset condition and the third preset condition corresponds to frequency ranges that do not overlap with each other. It is determined that the first operation is performed when the first preset condition is met, and it is determined that the second operation is performed when the third preset condition is met.

In one embodiment, the first operation and the second operation are independently recognized. The operating signal Vo may include a first signal and a second signal. The first signal is in a fifth state, indicating the first operation being performed, in response to the collected acoustic wave being determined to include the first acoustic wave, and in a sixth state, indicating the first operation not being performed, in response to the collected acoustic wave not being determined to include the first acoustic wave. The second signal is in a seventh state, indicating the second operation being performed, in response to the collected acoustic wave being determined to include the second acoustic wave, and in an eighth state, indicating the second operation not being performed, in response to the collected acoustic wave not being determined to include the second acoustic wave. Herein a relationship among the first state, the second state, and the fifth to the eighth states are not limited, as long as the operating signal is in the first state in response to the first signal being in the fifth state, and the operation signal is in the second state in response to the second signal being in the seventh state.

In another embodiment, the first operation and the second operation are recognized as a combination of operations. That is, the operating signal Vo may be in a ninth state, which indicates the combination of operations being performed, in response to the collected acoustic wave being determined to include both the first acoustic wave and the second acoustic wave, and in a tenth state, which indicates the combination of operations not being performed, in response to the collected acoustic wave not being determined to include the first acoustic wave or the second acoustic wave. A relationship among the first state, the second state, and the ninth state are not limited. The three states may be different from each other, may include a pair of identical states, or may be all identical.

In another embodiment, the first operation and the second operation are recognized as "parallel" operations to trigger a same result. That is, the result is triggered when either the first operation or the second operation is performed. Hence, the operating signal Vo may be in an eleventh state, which indicates either operation being performed, in response to the collected acoustic wave being determined to include either the first acoustic wave or the second acoustic wave, and in a twelfth state, which indicates neither operation being performed, in response to the collected acoustic wave including neither the first acoustic wave nor the second acoustic wave. A relationship among the first state, the second state, and the eleventh state are not limited. The three states may be different from each other, may include a pair of identical states, or may be all identical.

Alternatively, in the above case of "parallel" operations, the first acoustic wave and the second acoustic wave may be identical in frequency. Accordingly, the first preset condition is same as the third preset condition, and it is determined that the operation is performed when either the first acoustic source 101 or the second acoustic source 102 is triggered.

Figure 9:
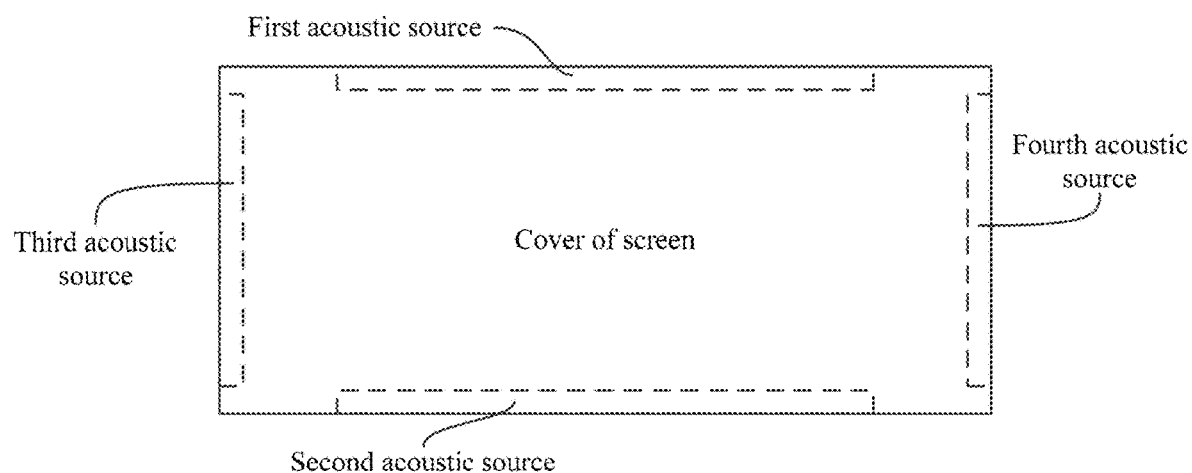
FIG. 9 is a schematic diagram of arrangement of acoustic sources in an electronic device according to an embodiment of the present disclosure.

It is appreciated that a quantity of acoustic sources may be more than two. Details can be deduced from the above embodiments in which the quantity is two, and hence such cases are not enumerated herein. Hereinafter an example is illustrated to shown multiple acoustic sources corresponding to operations performed on different portions. Reference is made to FIG. 9, is a schematic diagram of arrangement of acoustic sources in an electronic device according to an embodiment of the present disclosure. As shown in FIG. 9, the electronic device 1 includes a screen, and a cover is provided above the screen and serves as a part of the housing. The cover may be made of, for example, glass, polymer, or other transparent or at least semitransparent materials. A first acoustic source to a fourth acoustic source are arranged at four edges, respectively, of the cover, and serve the acoustic sources of the acoustic input apparatus 10. When a user taps any of the four acoustic sources, the acoustic source would generate an acoustic wave, and a microphone (not depicted) located in the electronic device 1 would collect the acoustic wave. In this embodiment, the microphone serves as the acoustic transducer 103 of the acoustic input apparatus 10. It is assumed that the four acoustic sources have configurations different from each other, and hence are capable to generate acoustic waves of different frequencies. Therefore, the comparing circuit 104 may compare the electrical signal $V_{in}$ with four different frequencies ranges, so as to determine which is met among four preset conditions related to the four different frequencies, respectively. In a case that one of the four preset conditions is met, it is determined that an acoustic wave collected by the microphone includes a component generated by a corresponding acoustic source, and it is further determined that a tap has performed on an edge at which the acoustic source is located. It is appreciated that the present disclosure is not limited to the example as illustrated above. The acoustic sources may be configured or arranged otherwise, as long as one or more operation of the user can be recognized correspondingly.

In some embodiments, when the electrical signal further reflects an intensity of the collected acoustic wave, the comparing circuit 104 is configured to determine whether the collected acoustic wave includes the second acoustic wave further based on whether the intensity of the collected acoustic wave meets a fourth preset condition. In some embodiments, the fourth preset condition is determined based on a second intensity of the second acoustic wave. Details of the fourth preset condition for the second acoustic wave may refer to the foregoing description of the second preset condition for the first acoustic wave, and hence are not repeated herein.

Figure 10:
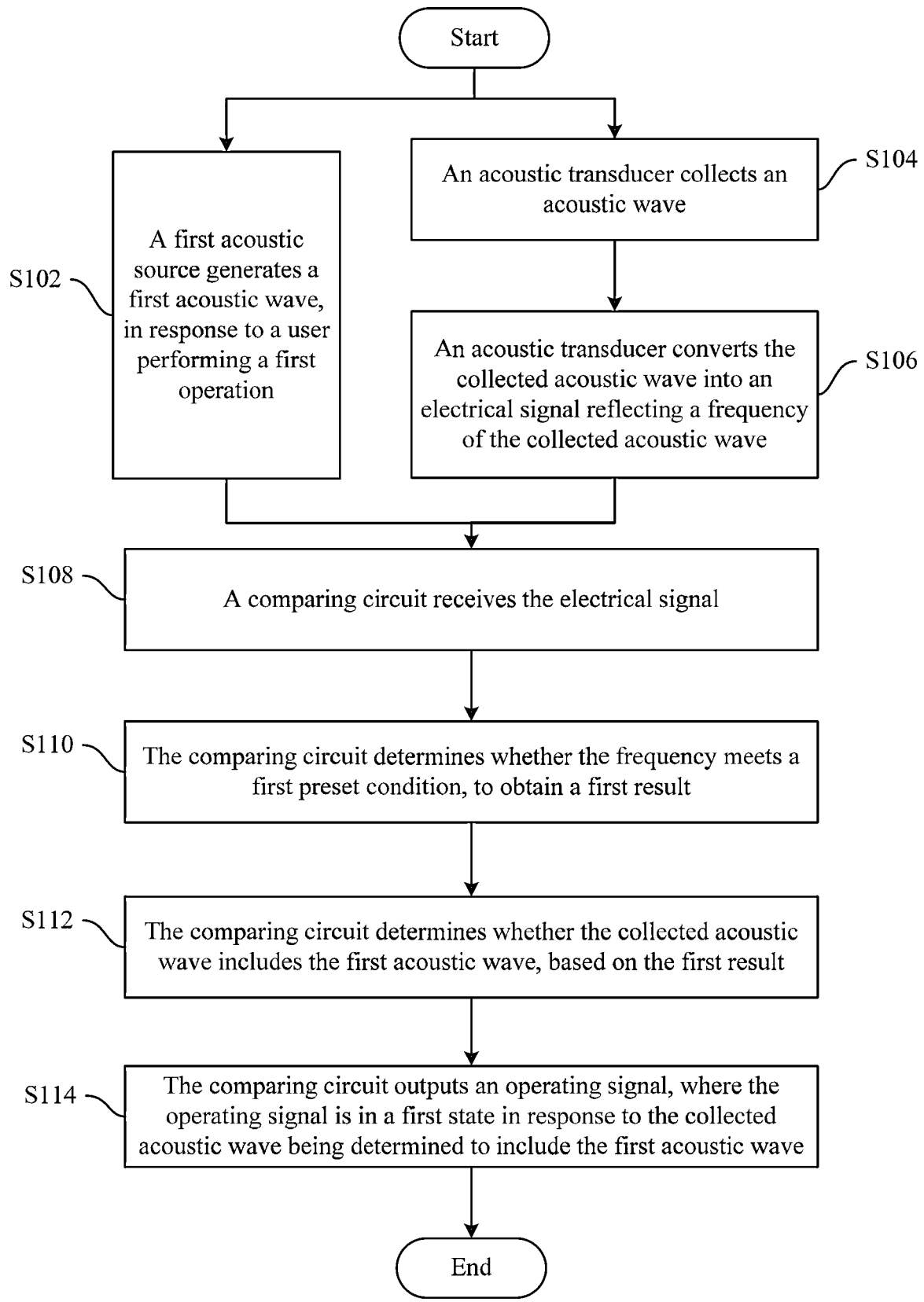
FIG. 10 is a flow chart of an acoustic input method according to an embodiment of the present disclosure.

In a second aspect of embodiments of the present disclosure, an acoustic input method is provided. Reference is made to FIG. 10, which is a flow chart of an acoustic input method according to an embodiment of the present disclosure. The acoustic input method includes following steps S102 to S111.

In step S102, a first acoustic source generates a first acoustic wave, in response to a user performing a first operation.

In step S104, an acoustic transducer collects an acoustic wave.

In step S106, an acoustic transducer converts the collected acoustic wave into an electrical signal reflecting a frequency of the collected acoustic wave.

Herein a sequence of the steps S102, S104, and S106 are not limited, as long as the step S104 is performed before the step S106. That is, the step S102 may be performed before, after, or during performing the steps S104 and S106. In some embodiments, the steps S104 and S106 are continuous, i.e., the acoustic transducer keeps monitoring the acoustic wave that can be collected.

In step S108, a comparing circuit receives the electrical signal.

In step S110, the comparing circuit determines whether the frequency meets a first preset condition, to obtain a first result. In one embodiment, the first preset condition is determined based on a first frequency of the first acoustic wave.

In step S112, the comparing circuit determines whether the collected acoustic wave includes the first acoustic wave, based on the first result.

In step S114, the comparing circuit outputs an operating signal. The operating signal is in a first state in response to the collected acoustic wave being determined to include the first acoustic wave.

Figure 11:
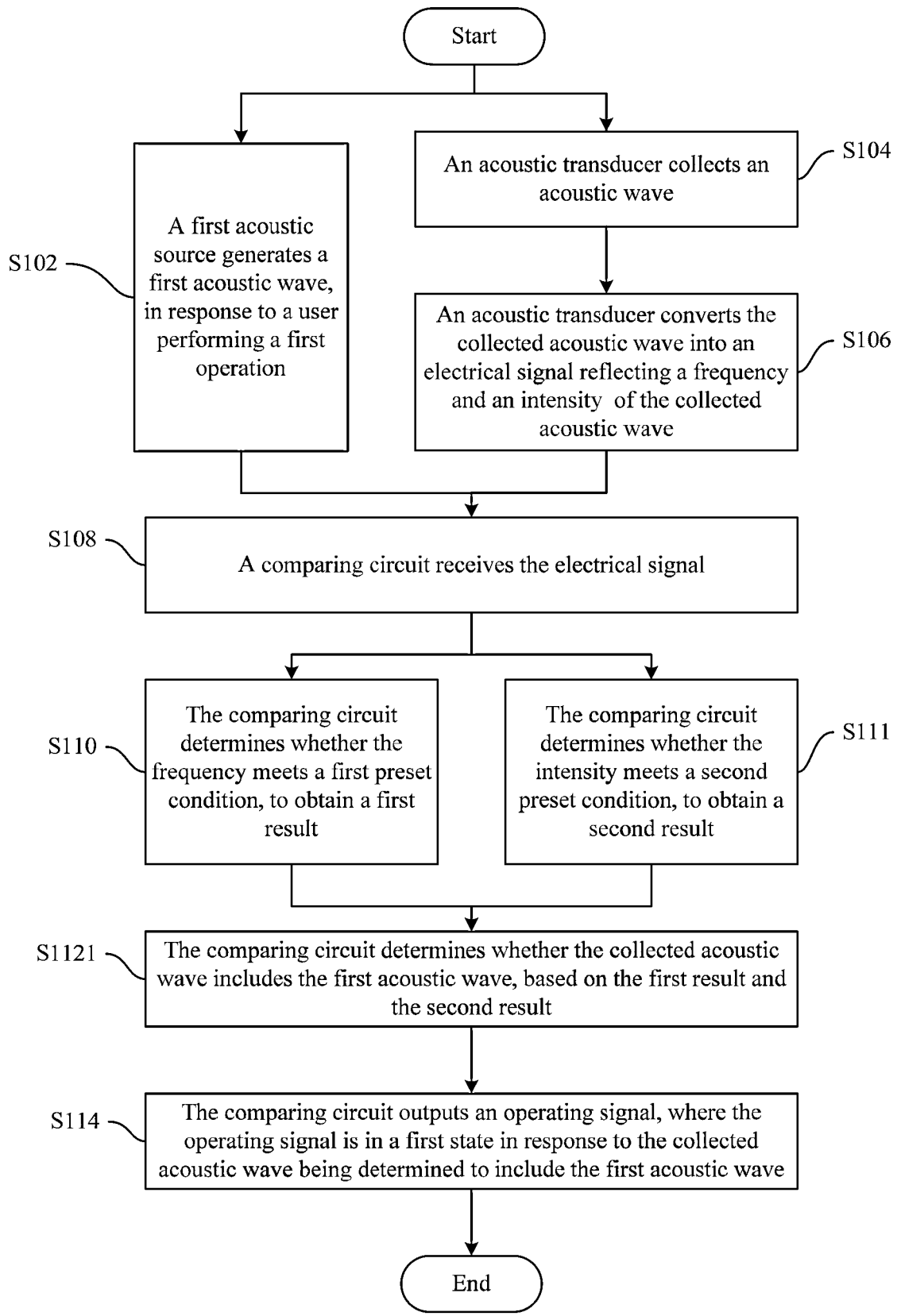
FIG. 11 is another flow chart of an acoustic input method according to an embodiment of the present disclosure.

On a basis of the embodiment as shown in FIG. 10, reference is made to FIG. 11, which is another flow chart of an acoustic input method according to an embodiment of the present disclosure. In one embodiment, the electrical signal further reflects an intensity of the collected acoustic wave. The acoustic input method further includes step S111, and the step S112 includes step S1121.

In step S111, the comparing circuit determines whether the intensity meets a second preset condition, to obtain a second result. In one embodiment, the second preset condition is determined based on a first intensity of the first acoustic wave.

Herein a sequence of the steps S110 and S111 is not limited, as long as the step S111 is performed after the step S108 and before the step S112. That is, the step S111 may be performed before, after, or during performing the step S110.

In step S1121, the comparing circuit determines whether the collected acoustic wave includes the first acoustic wave, based on the first result and the second result.

Figure 12:
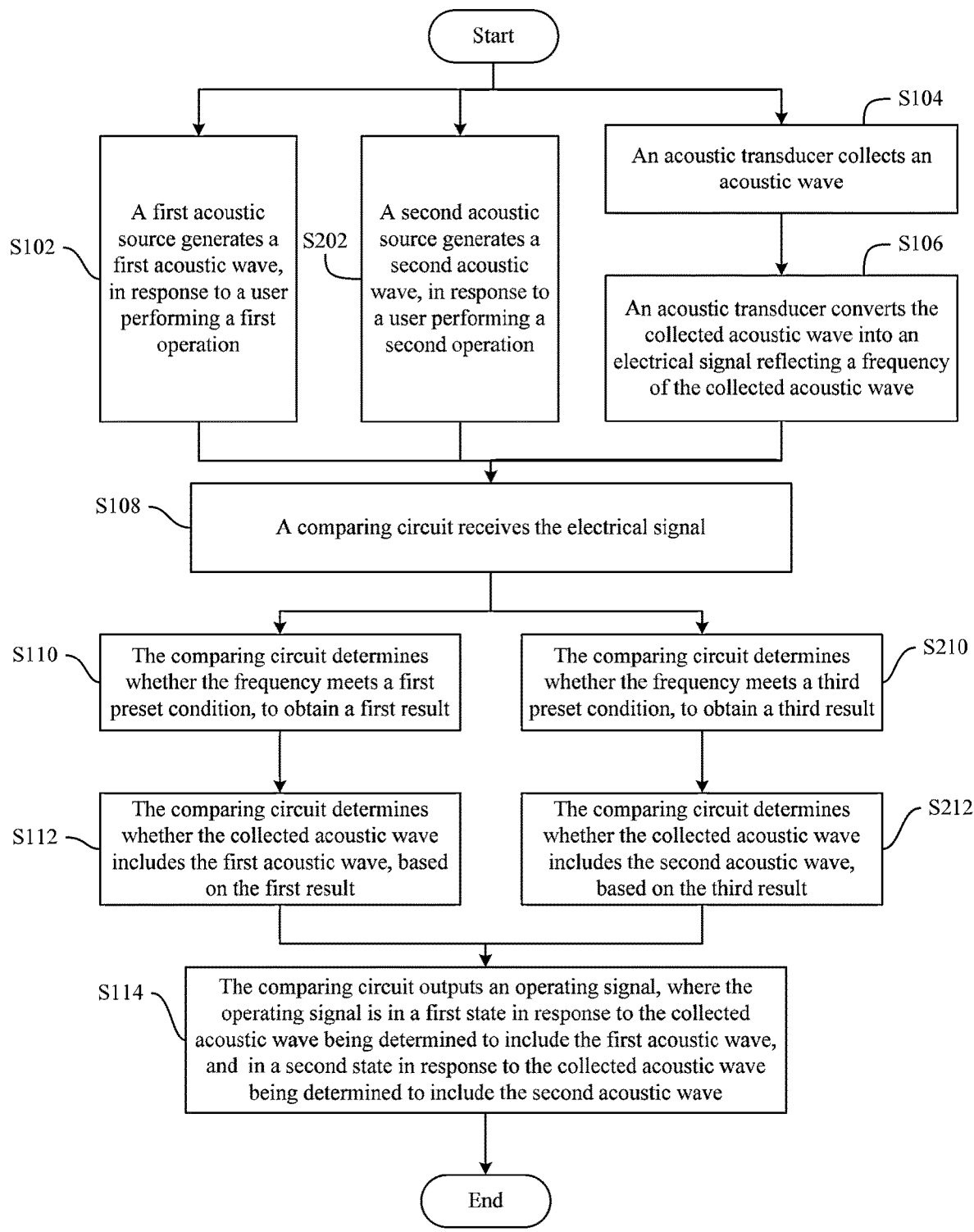
FIG. 12 is another flow chart of an acoustic input method according to an embodiment of the present disclosure.

On a basis of the embodiment as shown in FIG. 10, reference is made to FIG. 12, which is another flow chart of an acoustic input method according to an embodiment of the present disclosure. In one embodiment, the method further includes steps S202, S210, and S212.

In step S202, a second acoustic source generates a second acoustic wave, in response to a user performing a second operation.

Herein a sequence of the steps S102 and S202 is not limited, as long as the step S202 is performed before the step S108. That is, the step S202 may be performed before, after, or during performing the step S102. Further, similar to S102, a sequence of the steps S202, S104, and S106 are not limited. The second operation may be directly performed on the second acoustic source, or indirectly on the second acoustic source via a mechanical or electrical element.

In step S210, the comparing circuit determines whether the frequency meets a third preset condition, to obtain a third result. In one embodiment, the third preset condition is determined based on a second frequency of the second acoustic wave.

In step S212, the comparing circuit determines whether the collected acoustic wave includes the second acoustic wave, based on the third result.

Herein a sequence of the steps S110 and S112 and steps S210 and S212 is not limited, as long as the step S112 is performed after the step S110 and before the step S114, and the step S212 is performed after the step S210 and before the step S114. That is, the steps S210 and S212 may be performed before, after, or during performing the steps S110 and S112.

In one embodiment, when the electrical signal further reflects an intensity of the collected acoustic wave, the method further includes step S211, and the step S212 includes step S2121.

In step S211, the comparing circuit determines whether the intensity meets a fourth preset condition, to obtain a fourth result. In one embodiment, the fourth preset condition is determined based on a second intensity of the second acoustic wave.

Herein a sequence of the steps S210 and S211 is not limited, as long as the step S211 is performed after the step S108 and before the step S212. That is, the step S211 may be performed before, after, or during performing the step S210.

In step S2121, the comparing circuit determines whether the collected acoustic wave includes the second acoustic wave, based on the third result and the fourth result.

In one embodiment, the first preset condition includes one or both of: the frequency being higher than a first threshold and the frequency being lower than a second threshold. In one embodiment, the third preset condition includes one or both of: the frequency being higher than a third threshold and the frequency being lower than a fourth threshold.

Other details of the acoustic input method may refer to the forgoing description concerning the acoustic input apparatus, and are not repeated herein.

According to embodiments of the present disclosure, the acoustic input method is provided. The first acoustic source generates the first acoustic wave, in response to the user performing the first operation. The acoustic transducer collects the acoustic wave and converts the collected acoustic wave into the electrical signal reflecting the frequency of the collected acoustic wave. The comparing circuit receives the electrical signal, determines whether the collected acoustic wave includes the first acoustic wave based on whether the frequency meets the first preset condition, and outputs the operating signal. The operating signal is in a first state in response to the collected acoustic wave including the first acoustic wave. Instead of an electrical signal, the operation of the user is embodied as the first acoustic wave that is transmitted from the first acoustic source to the acoustic transducer, and such transmission requires no electrical connection between the first acoustic source and the acoustic transducer. That is, an electronic device applying the method is simplified in wiring and robust to electromagnetic environment within an electronic device. Further, the frequency of the collected electronic wave serves as a criterion for controlling the state of the outputted operating signal, which ensures accuracy for recognizing an input of the user.

In a third aspect of embodiments of the present disclosure, an electronic device is provided. In one embodiment, the electronic device includes the acoustic input apparatus according to any forgoing embodiment. Alternatively or additionally, the electronic device includes a processor and a memory. The memory stores instructions, and the instructions when executed by the processor configure the electronic device to perform the acoustic input method according to any foregoing embodiment.

Figure 13:
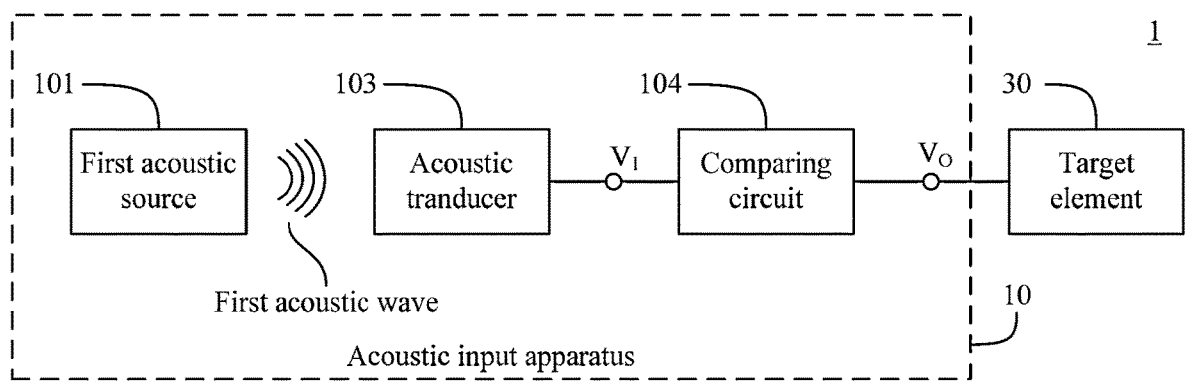
FIG. 13 is a schematic structural diagram of an electronic device according to an embodiment of the present disclosure.

Reference is made to FIG. 13, which is a schematic structural diagram of an electronic device according to an embodiment of the present disclosure. In one embodiment, the electronic device 1 further includes a target element 30, and a state of the target element is determined by the state of the operating signal Vo.

Since the acoustic input apparatus and the acoustic input method according to embodiments of the present disclosure may be applied to almost every kind of existing electronic devices, the electronic device may be, for example, a mobile phone, a computer, a pad, a electronic glasses, a earphone, an electronic wrist band, a smart watch, or the like.

Other details of the electronic device may refer to the forgoing description concerning the acoustic input apparatus and the acoustic input method, and are not repeated herein.

In a fourth aspect of embodiments of the present disclosure, a non-transitory computer readable medium is provided. The computer readable medium stores instructions, and the instructions when executed by a processor configure a computer to perform the acoustic input method according any foregoing embodiment.

Other details of the computer readable medium may refer to the forgoing description concerning the acoustic input apparatus and the acoustic input method, and are not repeated herein.

The computer readable storage medium includes program instructions, data files, data structure, etc., or a combination thereof. A program recorded in the computer readable storage medium may be programmed or configured to implement the method of the present disclosure. The computer readable storage medium further includes a hardware system for storing and executing the program instructions. The hardware system may be a magnetic medium (such as a hard disk, a floppy disk, and a magnetic tape), or an optical medium (such as a CD-ROM and a DVD), or a magneto-optical medium (such as a floppy optical disk, a ROM, a RAM, and a flash memory, etc.). The program includes assembly language codes or machine codes compiled by a compiler and higher-level language codes interpreted by an interpreter. The hardware system may be implemented with at least one software module to comply with the present disclosure.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The embodiments of the present disclosure are described in a progressive manner, and each embodiment places emphasis on the difference from other embodiments. Therefore, one embodiment can refer to other embodiments for the same or similar parts. Since the methods disclosed in the embodiments correspond to the apparatuses disclosed in the embodiments, the description of the methods is simple, and reference may be made to the relevant part of the apparatuses.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An acoustic input apparatus, comprising:
   a first acoustic source, configured to generate a first acoustic wave, in response to a user performing a first operation;
   an acoustic transducer, configured to collect an acoustic wave and convert the collected acoustic wave into an electrical signal reflecting a frequency of the collected acoustic wave; and
   a comparing circuit, configured to receive the electrical signal, determine whether the collected acoustic wave comprises the first acoustic wave based on whether the frequency meets a first preset condition, and output an operating signal;
   wherein the first preset condition is determined based on a first frequency of the first acoustic wave; and
   wherein the operating signal is in a first state in response to the collected acoustic wave being determined to comprise the first acoustic wave,
   wherein the acoustic source comprises a toothed wheel, and the first operation is rolling the toothed wheel, when the toothed wheel rotates, the first acoustic source generates the first acoustic wave, whose frequency component is in proportion to a rotation speed of the toothed wheel.

2. The acoustic input apparatus according to claim 1, wherein the acoustic transducer and the comparing circuit is located on a circuit board of an electronic device.

3. The acoustic input apparatus according to claim 2, wherein the first acoustic source is electrically disconnected from the circuit board.

4. The acoustic input apparatus according to claim 3, wherein there is no cable or wiring arranged between the first acoustic source and the circuit board, and the first acoustic source is not electrically powered when generating the first acoustic wave.

5. The acoustic input apparatus according to claim 1, wherein the first operation is a touch operation.

6. The acoustic input apparatus according to claim 5, wherein the first acoustic source comprises a cavity, and a dimension of the cavity is determined by the first preset condition.

7. The acoustic input apparatus according to claim 5, wherein the first acoustic source is inlaid in a portion of the housing, and a material of the first acoustic source is different from a material of the portion.

8. The acoustic input apparatus according to claim 1, wherein:
   the electrical signal further reflects an intensity of the collected acoustic wave;
   the comparing circuit is configured to determine whether the collected acoustic wave comprises the first acoustic wave further based on whether the intensity meets a second preset condition; and
   the second preset condition is determined based on a first intensity of the first acoustic wave.

9. The acoustic input apparatus according to claim 1, further comprising:
   a second acoustic source, configured to generate a second acoustic wave, in response to the user performing a second operation;
   wherein the comparing circuit is further configured to determine whether the collected acoustic wave comprises the second acoustic wave based on whether the frequency meets a third preset condition;
   wherein the third preset condition is determined based on a second frequency of the second acoustic wave; and
   wherein the operating signal is in a second state in response to the collected acoustic wave being determined to comprise the second acoustic wave.

10. The acoustic input apparatus according to claim 9, wherein:
    the second operation is the first operation; and
    the first acoustic wave and the second acoustic wave are different in frequency, different in intensity, or different in both frequency and intensity.

11. The acoustic input apparatus according to claim 10, wherein the operating signal is in a third state in response to the collected acoustic wave being determined to comprise both the first acoustic wave and the second acoustic wave, and in a fourth state in response to the collected acoustic wave not being determined to comprise the first acoustic wave or the second acoustic wave.

12. The acoustic input apparatus according to claim 10, wherein the operating signal comprises a first signal and a second signal;
    the first signal is in a fifth state in response to the collected acoustic wave being determined to comprise the first acoustic wave, and in a sixth state in response to the collected acoustic wave not being determined to comprise the first acoustic wave; and
    the second signal is in a seventh state in response to the collected acoustic wave being determined to comprise the second acoustic wave, and in an eighth state in response to the collected acoustic wave not being determined to comprise the second acoustic wave.

13. The acoustic input apparatus according to claim 9, wherein:
    the comparing circuit is configured to determine whether the collected acoustic wave comprises the second acoustic wave further based on whether the intensity of the collected acoustic wave meets a fourth preset condition; and
    the fourth preset condition is determined based on a second intensity of the second acoustic wave.

14. The acoustic input apparatus according to claim 13, wherein:
    the first preset condition comprises one or both of the frequency being higher than a first threshold and the frequency being lower than a second threshold; and/or
    the third preset condition comprises one or both of the frequency being higher than a third threshold and the frequency being lower than a fourth threshold.

15. An acoustic input method, comprising:
    generating, by a first acoustic source, a first acoustic wave, in response to a user performing a first operation;
    collecting, by an acoustic transducer, an acoustic wave;
    converting, by an acoustic transducer, the acoustic wave into an electrical signal reflecting a frequency of the collected acoustic wave;
    receiving, by a comparing circuit, the electrical signal;
    determining, by the comparing circuit, whether the frequency meets a first preset condition, to obtain a first result;
    determining, by the comparing circuit, whether the collected acoustic wave comprises the first acoustic wave based on the first result; and
    outputting an operating signal by the comparing circuit, wherein the operating signal is in a first state in response to the collected acoustic wave being determined to comprise the first acoustic wave;

wherein the first preset condition is determined based on a first frequency of the first acoustic wave, wherein the acoustic source comprises a toothed wheel, and the first operation is rolling the toothed wheel, when the toothed wheel rotates, the first acoustic source generates the first acoustic wave, whose frequency component is in proportion to a rotation speed of the toothed wheel.

16. The acoustic input method according to claim 15, wherein the electrical signal further reflects an intensity of the collected acoustic wave, and the method further comprises:

determining, by the comparing circuit, whether the intensity of the collected acoustic wave meets a second preset condition, to obtain a second result;

wherein the second preset condition is determined based on a first intensity of the first acoustic wave; and wherein determining whether the collected acoustic wave comprises the first acoustic wave based on the first result comprises:

determining whether the collected acoustic wave comprises the first acoustic wave based on the first result and the second result.

17. The acoustic input method according to claim 15, further comprising:

generating, by a second acoustic source, a second acoustic wave, in response to a user performing a second operation;

determining, by the comparing circuit, whether the frequency meets a third preset condition, to obtain a third result; and determining, by the comparing circuit, whether the collected acoustic wave comprises the second acoustic wave based on the third result;

wherein the third preset condition is determined based on a second frequency of the second acoustic wave; and wherein the operating signal is in a second state in response to the collected acoustic wave being determined to comprise the second acoustic wave.

18. The acoustic input method according to claim 17, further comprising:

determining, by the comparing circuit, whether the intensity of the collected acoustic wave meets a fourth preset condition, to obtain a fourth result;

wherein the fourth preset condition is determined based on a second intensity of the second acoustic wave; and wherein determining whether the collected acoustic wave comprises the second acoustic wave based on the third result comprises:

determining whether the collected acoustic wave comprises the second acoustic wave based on the third result and the fourth result.

19. An electronic device, comprising:

a processor, and a memory storing instructions, wherein the instructions when executed by the processor configure the electronic device to perform the acoustic input method according to claim 18.

* * * * *